US011865697B2

(12) United States Patent
Watanabe et al.

(10) Patent No.: US 11,865,697 B2
(45) Date of Patent: Jan. 9, 2024

(54) ROBOT SYSTEM AND METHOD FOR OPERATING SAME (71) Applicant: KAWASAKI JUKOGYO KABUSHIKI KAISHA, Kobe (JP)

(72) Inventors: Masayuki Watanabe, Kobe (JP); Takayuki Yoshimura, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 610 days.

(21) Appl. No.: 16/636,139

(22) PCT Filed: Jul. 27, 2018

(86) PCT No.: PCT/JP2018/028251
§ 371 (c)(1),
(2) Date: Feb. 3, 2020

(87) PCT Pub. No.: WO2019/026790
PCT Pub. Date: Feb. 7, 2019

(65) Prior Publication Data
US 2020/0156258 A1 May 21, 2020

(30) Foreign Application Priority Data
Aug. 2, 2017 (JP) ................................ 2017-149757

(51) Int. Cl.
B25J 1/00 (2006.01)
B25J 13/06 (2006.01)
(Continued)

(52) U.S. Cl.
CPC ........... B25J 13/065 (2013.01); B25J 13/003 (2013.01); G02B 27/0172 (2013.01);
(Continued)

(58) Field of Classification Search
CPC ... B25J 13/065; B25J 13/003; G02B 27/0172; G02B 2027/0138; G02B 2027/0178; G06F 3/011; G06T 11/00
(Continued)

(56) References Cited

U.S. PATENT DOCUMENTS 9,916,506 B1 * 3/2018 Davis ................... G06T 7/0002
2010/0082156 A1 * 4/2010 Root .................... G05D 1/0038
901/50
(Continued)

FOREIGN PATENT DOCUMENTS

JP 2002-361581 A 12/2002
JP 2009-119579 A 6/2009
(Continued)

Primary Examiner — Tyler J Lee
Assistant Examiner — Tiffany P Ohman
(74) Attorney, Agent, or Firm — Oliff PLC (57) ABSTRACT A robot system includes an operating device that receives an operation instruction from an operator. The system further includes a real robot that is installed in a work space and performs a series of works constituted of a plurality of steps. The system further includes transmission type display device configured to allow the operator to visually recognize a real world and configured to display a virtual. The system further includes a control device configured to operate the virtual robot displayed on the transmission type display device based on instruction information input from the operating device. The control device is further configured to thereafter operate the real robot while maintaining a state that the virtual robot is displayed on the transmission type display device when operation execution information to execute an operation of the real robot is input from the operating device.

10 Claims, 10 Drawing Sheets (51) Int. Cl.
  *B25J 13/00*      (2006.01)
  *G02B 27/01*      (2006.01)
  *G06F 3/01*       (2006.01)
  *G06T 11/00*      (2006.01)
(52) U.S. Cl.
  CPC .............. *G06F 3/011* (2013.01); *G06T 11/00* (2013.01); *G02B 2027/0138* (2013.01); *G02B 2027/0178* (2013.01)
(58) Field of Classification Search
  USPC ........................................................ 700/264
  See application file for complete search history.

(56) References Cited

U.S. PATENT DOCUMENTS

| | | | |
|---|---|---|---|
| 2016/0158937 A1* | 6/2016 | Kamoi | B25J 9/1605 901/5 |
| 2016/0257000 A1* | 9/2016 | Guerin | B25J 9/1605 |

FOREIGN PATENT DOCUMENTS

| | | |
|---|---|---|
| JP | 2011-118924 A | 6/2011 |
| JP | 2012-218120 A | 11/2012 |
| JP | 2016-107379 A | 6/2016 |
| JP | 2016-197393 A | 11/2016 |

* cited by examiner

ROBOT SYSTEM AND METHOD FOR OPERATING SAME

TECHNICAL FIELD

The present invention relates to a robot system and a method for operating the same.

BACKGROUND ART

A robot system has been known that provides information about the state of a robot or an operation guide to a user of the robot in an actual image or an actual environment using an augmented reality display (see, for example, PTL 1). In a robot system disclosed in PTL 1, additional information that visually indicates the state of the robot or the operation guide is superimposed on the display.

CITATION LIST

Patent Literature

PTL 1: JP 2016-107379 A

SUMMARY OF INVENTION

Technical Problem

Incidentally, when an operator teaches or operates an operation of fitting a held workpiece to a fitting part, it is necessary to carefully position the robot for preventing a contact of the work with other portions, and the like.

In the robot system disclosed in PTL 1 above, an orthogonal coordinate system with a distal end portion of the robot being an origin is displayed. However, this information alone is insufficient to perform positioning, a load on the operator is large, and there has still been room for improvement from the viewpoint of improving work efficiency.

The present invention solves the above-described conventional problems, and an object thereof is to provide a robot system and a method for operating the same that can reduce a load on an operator and improve work efficiency.

Solution to Problem

In order to solve the above-described conventional problems, a robot system according to the present invention includes an operating device that receives an operation instruction from an operator, a real robot that is installed in a work space and performs a series of works constituted of a plurality of steps, a transmission type display device configured to allow the operator to visually recognize a real world and configured to display a virtual robot, and a control device, in which the control device is configured to operate the virtual robot displayed on the transmission type display device based on instruction information input from the operating device, and thereafter operate the real robot while maintaining a state that the virtual robot is displayed on the transmission type display device when operation execution information to execute an operation of the real robot is input from the operating device.

Thus, since the virtual robot operates based on the instruction information before operation of the real robot, a position after the operation can be visually grasped. Accordingly, for example, it is possible to easily determine whether or not a workpiece held by a real robot body and/or the real robot comes into contact with a device or the like arranged in the work space, and positioning of a distal end of the real robot can be easily performed. Therefore, a load on the operator can be reduced and work efficiency can be improved.

In a method for operating a robot system according to the present invention, the robot system includes an operating device that receives an operation instruction from an operator, a real robot that is installed in a work space and performs a series of works constituted of a plurality of steps, and a transmission type display device configured to allow the operator to visually recognize a real world and configured to display a virtual robot, and the method includes (A) displaying, by the transmission type display device, an operation of the virtual robot based on instruction information input from the operating device, and (B) operating, after the (A), the real robot based on the instruction information input from the operating device in a state that the transmission type display device displays the virtual robot when start information to start an operation of the real robot is input from the operating device.

Thus, since the virtual robot operates based on the instruction information before operation of the real robot, a position after the operation can be visually grasped. Accordingly, for example, it is possible to easily determine whether or not a workpiece held by a real robot body and/or the real robot comes into contact with a device or the like arranged in the work space, and positioning of a distal end of the real robot can be easily performed. Therefore, a load on the operator can be reduced and work efficiency can be improved.

Advantageous Effects of Invention

A robot system and a method for operating the same of the present invention are capable of reducing a load on an operator and improving work efficiency.

DESCRIPTION OF EMBODIMENTS

Hereinafter, embodiments of the present invention will be described with reference to the drawings. Note that in all the drawings, the same or corresponding portions are denoted by the same reference numerals, and redundant descriptions are omitted. Moreover, in all the drawings, components for describing the present invention are extracted and illustrated, and illustration may be omitted about any other component. Furthermore, the present invention is not limited to the following embodiments.

Embodiment 1

The robot system according to Embodiment 1 includes an operating device that receives an operation instruction from an operator, a real robot that is installed in a work space and performs a series of works constituted of a plurality of steps, a transmission type display device configured to allow the operator to visually recognize a real world and configured to display a virtual robot, and a control device, in which the control device is configured to operate the virtual robot displayed on the transmission type display device based on instruction information input from the operating device, and thereafter operate the real robot in a state that the virtual robot is displayed on the transmission type display device when operation execution information to execute an operation of the real robot is input from the operating device.

Further, in the robot system according to Embodiment 1, the control device may be configured to display the virtual robot on the transmission type display device so as to overlap the real robot, and operate the virtual robot based on the instruction information when the instruction information is input from the operating device.

Further, in the robot system according to Embodiment 1, the operating device may be constituted of at least one of a mobile terminal, a master arm, a teaching pendant, a joystick, or a voice input device.

Furthermore, in the robot system according to Embodiment 1, the transmission type display device may be configured to be worn by the operator.

Hereinafter, an example of the robot system according to Embodiment 1 will be described with reference to FIGS. 1 to 8.

[Configuration of Robot System]

Figure 1:
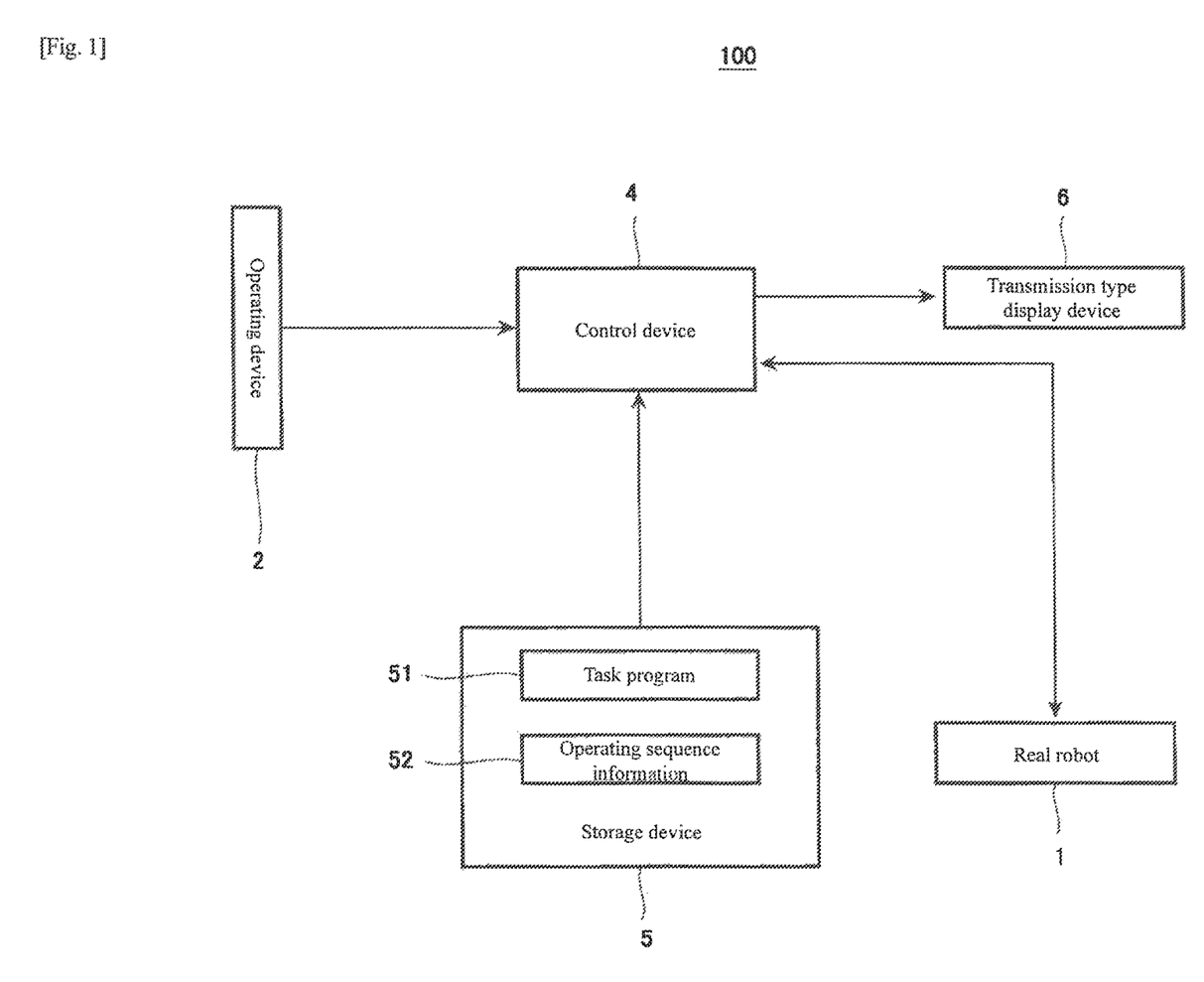
FIG. 1 is a block diagram illustrating a schematic configuration of a robot system according to Embodiment 1.
Figure 2:
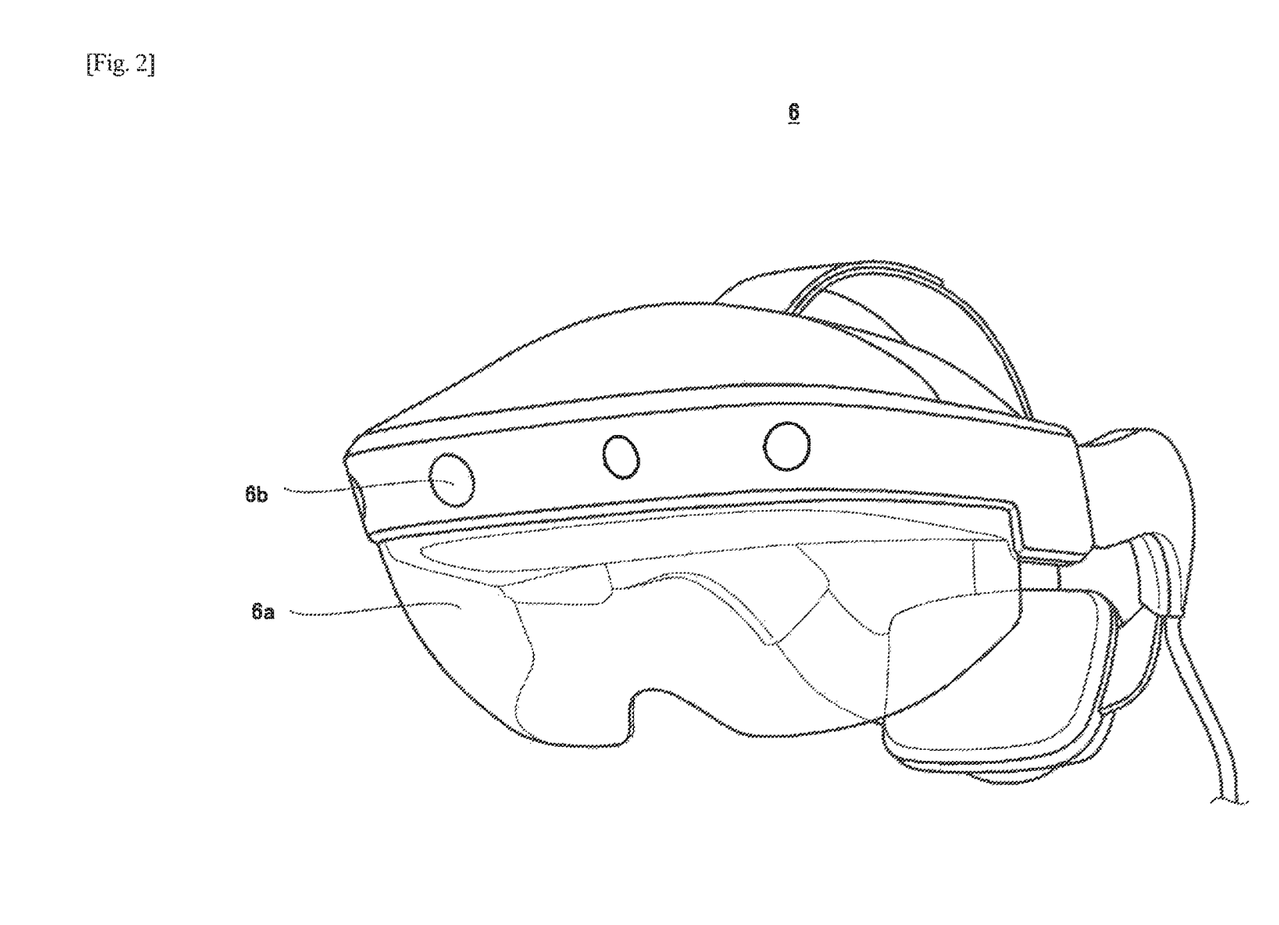
FIG. 2 is a schematic view illustrating an example of a transmission type display device of the robot system illustrated in FIG. 1.

FIG. 1 is a block diagram illustrating a schematic configuration of the robot system according to Embodiment 1. FIG. 2 is a schematic view illustrating an example of a transmission type display device of the robot system illustrated in FIG. 1.

As illustrated in FIG. 1, a robot system 100 according to Embodiment 1 includes a real robot 1, an operating device 2, a control device 4, a storage device 5, and a transmission type display device 6, and is configured such that the real robot 1 is operated by an operator operating the operating device 2. Further; in the robot system 100 according to Embodiment 1, when the operator operates the operating device 2, the control device 4 is configured to operate a virtual robot 3 (see FIG. 5) displayed on the transmission type display device 6, and thereafter execute an operation of the real robot 1 in a state that the virtual robot 3 is displayed on the transmission type display device 6 when operation execution information to execute an operation of the real robot 1 is input from the operating device 2. Hereinafter, each device included in the robot system 100 according to Embodiment 1 will be described.

The real robot 1 is installed in a work space and is configured to perform a series of works constituted of a plurality of steps. Note that as examples of the series of works constituted of a plurality of steps, operations such as assembling of a part to a product and painting can be exemplified.

The real robot 1 according to Embodiment 1 is an articulated robot that is used in a production factory that produces products by assembling electrical or electronic parts, or the like, in a line production system or a cell production system, and disposed along a work table provided in this production factory, and is capable of performing at least one of operations such as transferring, assembling or rearranging parts, changing a posture, or the like with respect to the workpiece on the work table. However, the embodiment of the real robot 1 is not limited to the above, and can be widely applied to an articulated robot regardless of whether it is a horizontal articulated type or a vertical articulated type.

Here, a specific configuration of the real robot 1 will be described with reference to FIG. 3.

Figure 3:
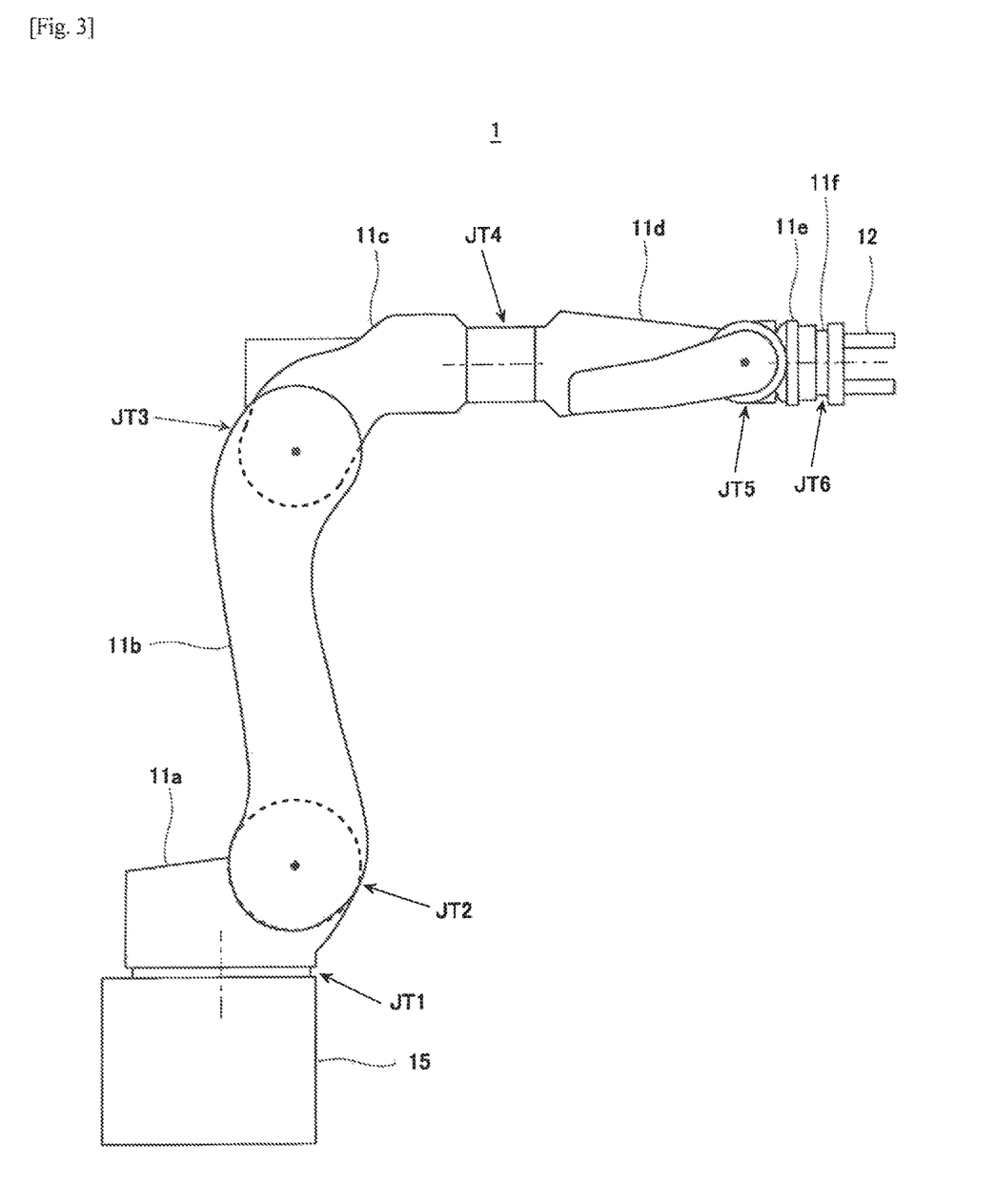
FIG. 3 is a schematic view illustrating a schematic configuration of a real robot in the robot system illustrated in FIG. 1.

FIG. 3 is a schematic view illustrating a schematic configuration of the real robot in the robot system illustrated in FIG. 1.

As illustrated in FIG. 3, the real robot 1 is an articulated robot arm having a connecting body of a plurality of links (here, a first link 11a to a sixth link 11f) and a plurality of joints (here, a first joint JT to a sixth joint JT6), and a base 15 that supports these parts.

At the first joint JT1, the base 15 and a proximal end of the first link 11a are connected to be rotatable about an axis extending in a vertical direction. At the second joint JT2, a distal end of the first link 11a and a proximal end of the second link 11b are connected to be rotatable about an axis extending in a horizontal direction. At the third joint JT3, a distal end of the second link 11b and a proximal end of the third link 11c are connected to be rotatable about an axis extending in the horizontal direction.

Further, at the fourth joint JT4, a distal end of the third link 11c and a proximal end of the fourth link 11d are connected to be rotatable about an axis extending in a longitudinal direction of the fourth link 11d. At the fifth joint JT5, a distal end of the fourth link 11d and a proximal end of the fifth link 11e are connected to be rotatable about an axis orthogonal to the longitudinal direction of the fourth link 11d. At the sixth joint JT6, a distal end of the fifth link 11e and a proximal end of the sixth link 11f are connected to be twistable and rotatable.

A mechanical interface is provided at a distal end of the sixth link 11f. An end effector 12 corresponding to a work content is detachably attached to the mechanical interface.

Further, the first joint JT1 to the sixth joint JT6 are each provided with a drive motor (not illustrated) as an example of an actuator that relatively rotates two members which the joint connects. The drive motor may be, for example, a servo motor servo-controlled by the control device 4. Further, each of the first joint JT1 to the sixth joint JT6 is provided with a rotation sensor that detects a rotational position of the drive motor and a current sensor that detects a current that controls rotation of the drive motor (both sensors are not illustrated). The rotation sensor may be an encoder, for example.

The operating device 2 is a device that is installed outside the work space and receives operation instructions from an operator. Examples of the operating device 2 include a mobile terminal, a master arm, a teaching pendant, a joystick, or a voice input device, and the like. Examples of the mobile terminal include a tablet, a smartphone, a laptop computer, and the like. Further, the operating device 2 may include a switching device (for example, a button) for switching display and non-display of the virtual robot 3 on the transmission type display device 6.

The storage device 5 is a readable-writable recording medium, and stores a task program 51 and operating sequence information 52 of the robot system 100. Note that in the robot system 100 according to Embodiment 1, the storage device 5 is provided separately from the control device 4, but may be provided integrally with the control device 4.

The task program 51 is created by, for example, teaching by the operator using the operating device 2 constituted of a teaching pendant or the like, and is associated with identification information and a task of the real robot 1 and stored in the storage device 5. Note that the task program 51 may be created as an operation flow for each work.

The operating sequence information 52 is information related to an operating sequence that defines a series of work steps performed by the real robot 1 in the work space. In the operating sequence information 52, an operation order of work steps and a control mode of the real robot 1 are associated with each other. Further, in the operating sequence information 52, a task program for causing the real robot 1 to automatically execute a work is associated with each work step. Note that the operating sequence information 52 may include a program for causing the real robot 1 to automatically execute a work for each work step.

The control device 4 controls operation of the real robot 1. The control device 4 includes, for example, an arithmetic unit (not illustrated) constituted of a microcontroller, MPU, a programmable logic controller (PLC), a logic circuit, or the like, and a memory unit (not illustrated) constituted of a ROM, a RAM, and/or the like. Further, each functional block included in the control device 4 can be implemented by an arithmetic unit of the control device 4 reading and executing a program stored in the memory unit (storage) or the storage device 5.

Note that the control device 4 may be not only in a mode to be constituted of a single control device, but also in a mode to be constituted of a control device group that controls the real robot 1 (robot system 100) by a plurality of control devices in cooperation.

Further, the control device 4 may display the virtual robot 3 on the transmission type display device 6 using data representing a three-dimensional model of the real robot 1 created in advance by three-dimensional CAD. Further, the control device 4 may display the virtual robot 3 on the transmission type display device 6 using image data obtained by scanning the real robot 1 with a three-dimensional scanner or the like.

The transmission type display device 6 is configured so that an operator can visually recognize a physical real world, and is configured to display video information (for example, the virtual robot 3) output from the control device 4. Specifically, as illustrated in FIG. 2, the transmission type display device 6 may be constituted of a head mount display or a pair of glasses that has a display unit 6a for projecting video information output from the control device 4, and is worn by an operator. Further, the transmission type display device 6 may be constituted of a stationary transmission display that is used while being laid on a desk, a floor, or the like.

Note that as illustrated in FIG. 2, the transmission type display device 6 may be provided with a camera 6b that obtains information on a real world that is visually recognized by the operator.

[Operations and Effects of Robot System]

Next, operations and effects of the robot system 100 according to Embodiment 1 will be described with reference to FIGS. 1 to 8.

Note that the following operations are executed by the arithmetic unit of the control device 4 reading a program stored in the memory unit or the storage device 5. Further, in the following, as illustrated in FIGS. 5 to 8, as a specific example of operation of the robot system 100 according to Embodiment 1, an operation of fitting a cylindrical workpiece 20 held by the real robot 1 into a protrusion 21a provided on a base 21 will be described.

Figure 4:
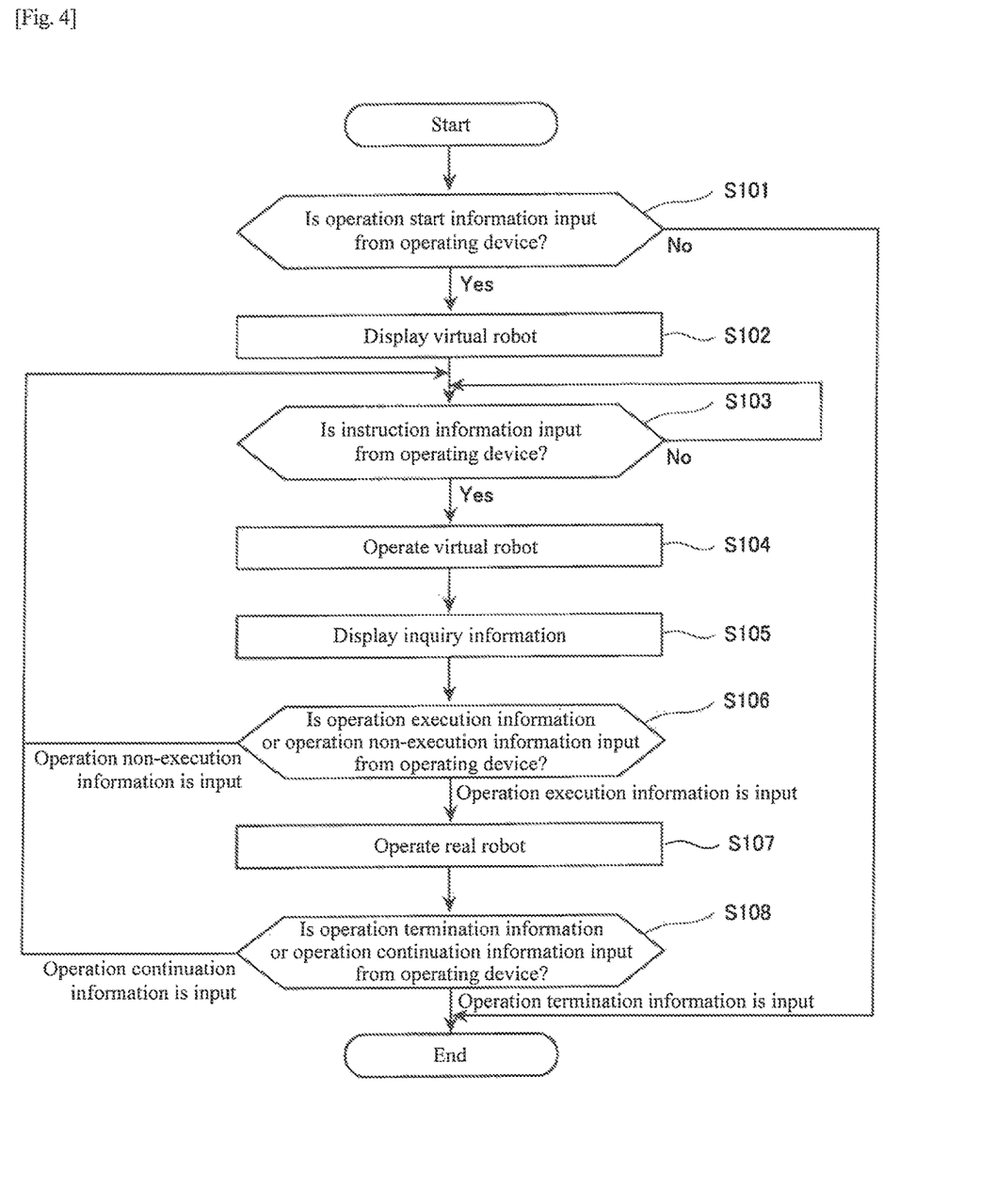
FIG. 4 is a flowchart illustrating an example of operation of the robot system according to Embodiment 1.
Figure 5:
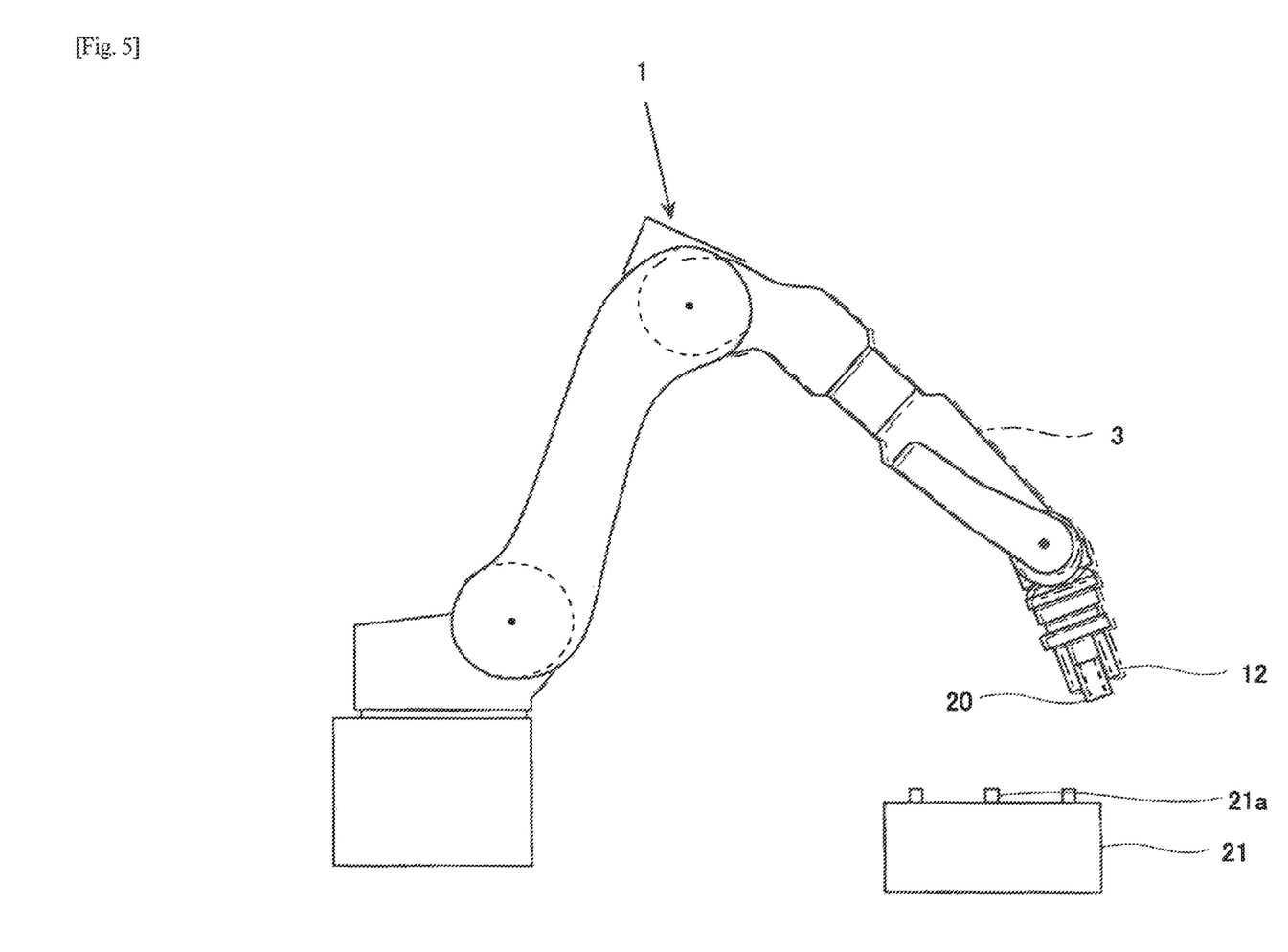
FIG. 5 is a schematic view illustrating a field of view visually recognized by an operator via the transmission type display device in the robot system according to Embodiment 1.

FIG. 4 is a flowchart illustrating an example of operation of the robot system according to Embodiment 1. FIGS. 5 to 8 are schematic views illustrating a field of view visually recognized by the operator via the transmission type display device in the robot system according to Embodiment 1. Note that in FIGS. 5 and 8, the virtual robot 3 and a virtual workpiece are indicated by one-dot chain lines, and the virtual robot 3 is displayed so as to be shifted from the real robot 1 so that the real robot 1 and the virtual robot 3 can be easily seen.

As illustrated in FIG. 4, the control device 4 determines whether or not operation start information (operation start signal) indicating that operation of the real robot 1 is started is input from the operating device 2 (step S101).

When the control device 4 determines that the operation start information is not input from the operating device 2 (No in step S101), the control device 4 terminates the program. Note that when the program is terminated, the control device 4 executes the program again after 50 msec, for example. On the other hand, when it is determined that the operation start information is input from the operating device 2 (Yes in step S101), the control device 4 executes the process of step S102.

In step S102, the control device 4 causes the transmission type display device 6 to display the virtual robot 3. At this time, the control device 4 may cause the transmission type display device 6 to display a virtual workpiece corresponding to the workpiece 20 held by the real robot 1. Further, the control device 4 may cause the transmission type display device 6 to display the virtual robot 3 so that the virtual robot 3 overlaps the real robot 1 visually recognized by the operator.

Note that the control device 4 may cause the transmission type display device 6 to display the virtual robot 3 so that the virtual robot 3 completely overlaps the real robot 1, may cause the transmission type display device 6 to display the virtual robot 3 so that the virtual robot 3 and the real robot 1 are slightly shifted, or may cause the transmission type display device 6 to display the virtual robot 3 so that the virtual robot 3 does not overlap the real robot 1 at all.

Next, the control device 4 determines whether or not the instruction information to the real robot 1 is input from the operating device 2 (step S103). Here, the instruction information includes, for example, position coordinates of the distal end of the real robot 1, a rotation angle of each axis constituting the real robot 1, and the like.

When it is determined that the instruction information is input from the operating device 2 (Yes in step S103), the control device 4 operates the virtual robot 3 displayed on the transmission type display device 6 based on the instruction information input in step S103 (step S104). Then, the control device 4 causes the transmission type display device 6 to display inquiry information for asking the operator whether or not the real robot 1 is to be operated (step S105). Examples of the inquiry information include text information such as "Do you want to operate the real robot 1?"

Next, the control device 4 determines whether operation execution information indicating to execute operation of the real robot 1 or operation non-execution information indicating not to execute operation of the real robot 1 is input from the operating device 2 (step S106).

Figure 6:
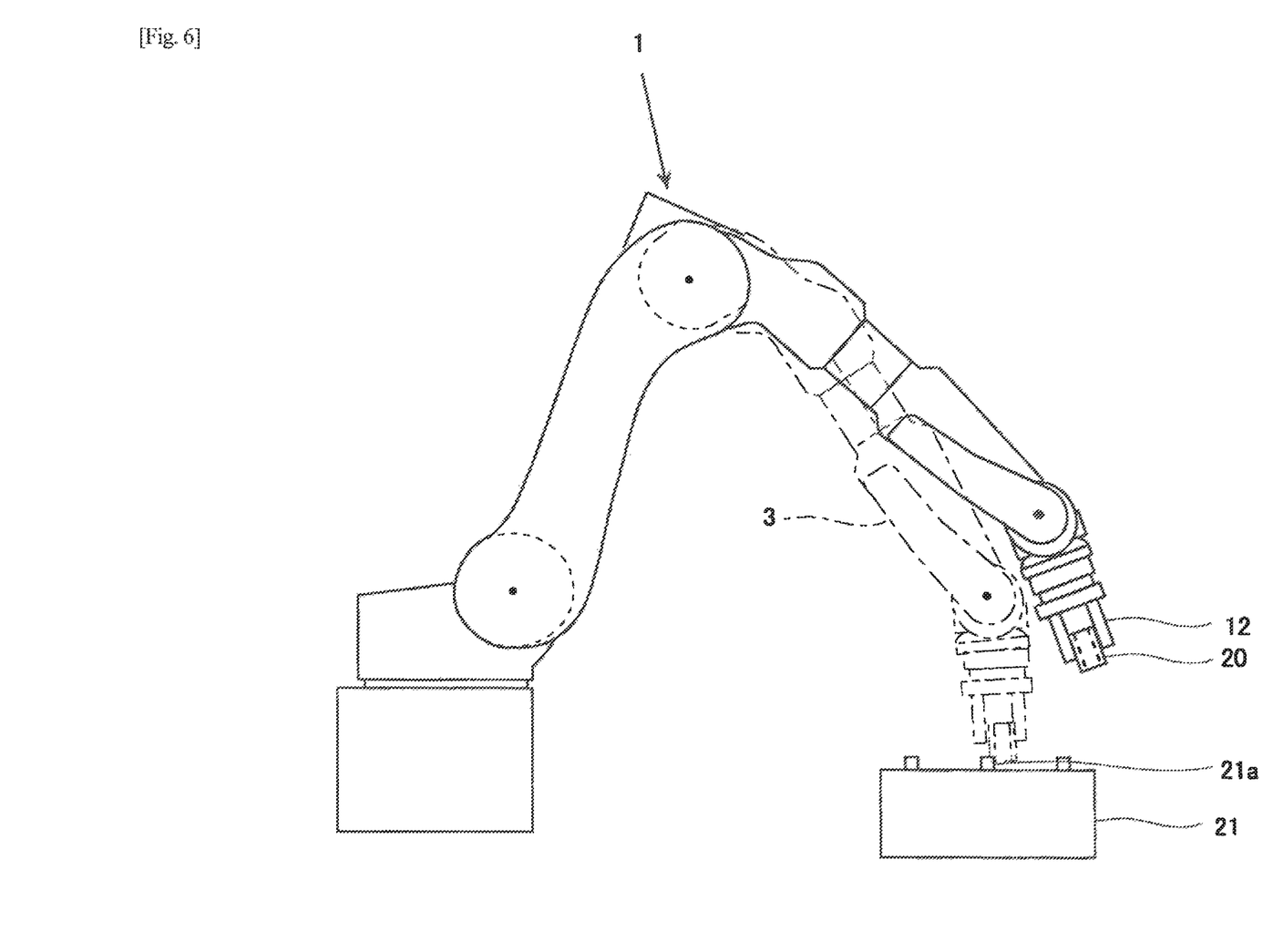
FIG. 6 is a schematic view illustrating a field of view visually recognized by an operator via the transmission type display device in the robot system according to Embodiment 1.

Here, as illustrated in FIG. 6, it is assumed that as a result of operating the virtual robot 3 displayed on the transmission type display device 6 based on the instruction information input in step S103, the cylindrical workpiece 20 collides with the protrusion 21a. In such a case, the operator can easily understand that the cylindrical workpiece 20 collides with the protrusion 21a when the real robot 1 is actually operated according to the instruction information input in step S103.

Accordingly, the operator operates the operating device 2 so that the real robot 1 does not operate based on the instruction information input in step S103. In this manner, the operation non-execution information is input to the control device 4 from the operating device 2 (operation is not executed in step S106), the control device 4 returns to step S103, instruction information is input again from the operating device 2 (step S103), and the processes of step S103 to step S106 such as operating the virtual robot 3 (step S104) are repeated.

Figure 7:
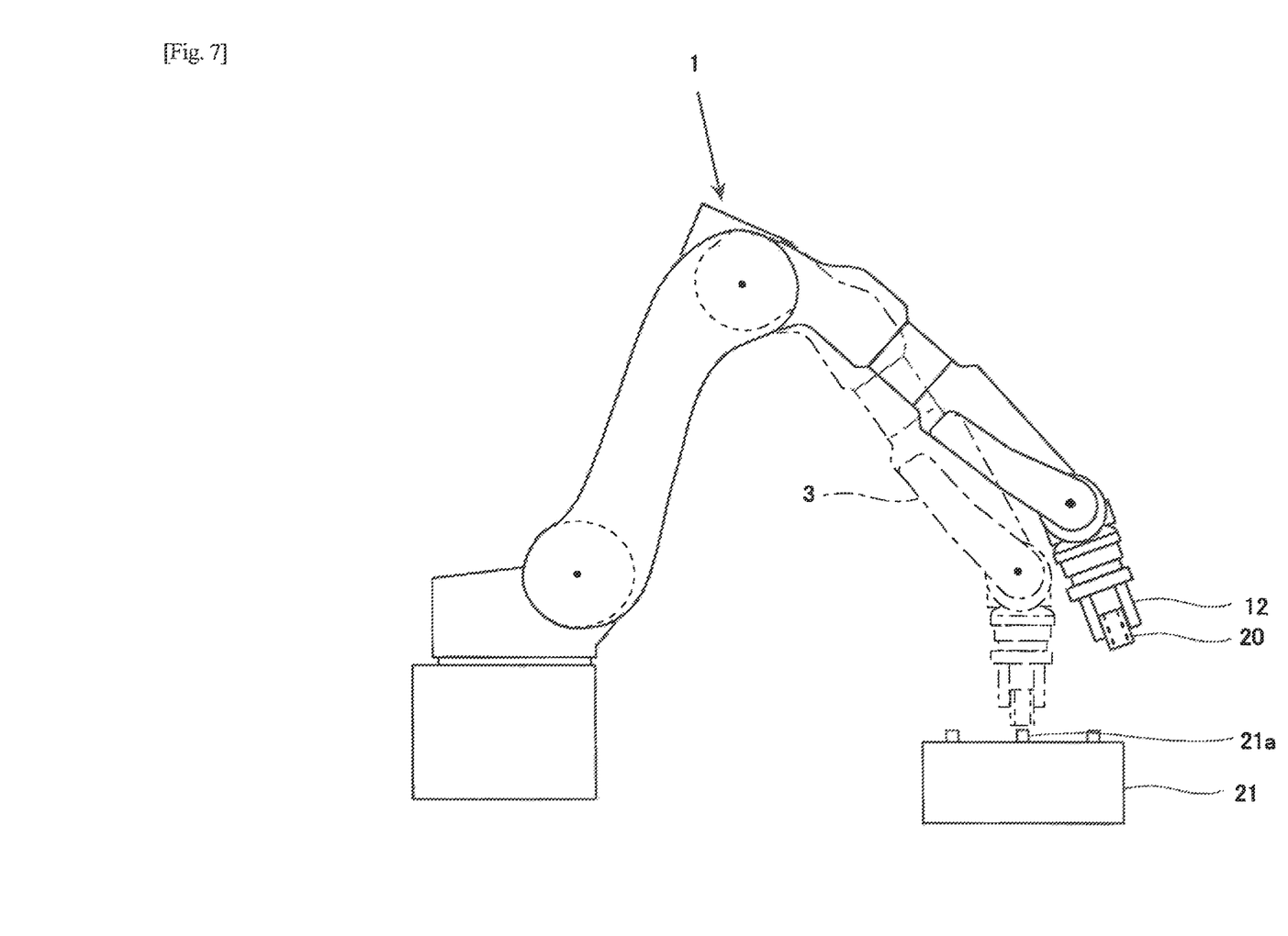
FIG. 7 is a schematic view illustrating a field of view visually recognized by the operator via the transmission type display device in the robot system according to Embodiment 1.

On the other hand, as illustrated in FIG. 7, it is assumed that as a result of operating the virtual robot 3 displayed on the transmission type display device 6 based on the instruction information input in step S103, the cylindrical workpiece 20 is positioned above (right above) the protrusion 21a. In such a case, the operator can easily understand that no problem occurs when the real robot 1 is actually operated according to the instruction information input in step S103.

Figure 8:
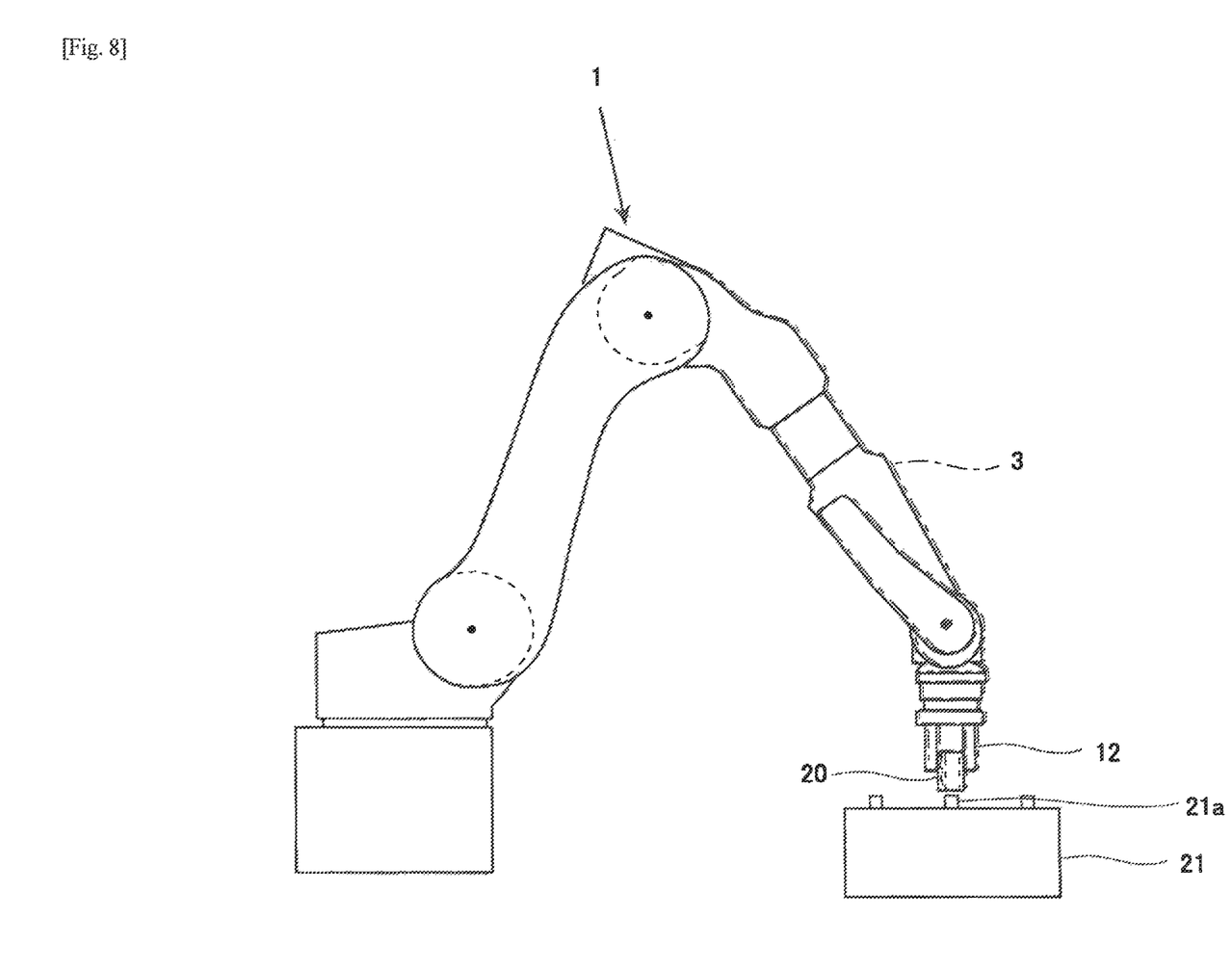
FIG. 8 is a schematic view illustrating a field of view visually recognized by the operator via the transmission type display device in the robot system according to Embodiment 1.

Accordingly, the operator operates the operating device 2 so that the real robot 1 operates based on the instruction information input in step S103. Thus, the operation execution information is input to the control device 4 from the operating device 2 (operation execution is performed in step S106), and the control device 4 operates the real robot 1 based on the instruction information input in step S103 (step S107). As a result, as illustrated in FIG. 8, the real robot 1 operates so that the cylindrical workpiece 20 is positioned above (right above) the protrusion 21a.

Next, the control device 4 determines whether operation continuation information indicating to continue the operation of the real robot 1 is input from the operating device 2 or operation termination information indicating to terminate the operation of the real robot 1 is input from the operating device 2 (step S108).

When it is determined that the operation continuation information is input from the operating device 2 (the operation continuation information is input in step S108), the control device 4 performs the respective processes of steps S103 to S108 until it is determined that the operation termination information is input. On the other hand, when it is determined that the operation termination information is input from the operating device 2 (the operation termination information is input in step S108), the control device 4 terminates the program.

In the robot system 100 according to Embodiment 1 configured as described above, when the instruction information is input from the operating device 2, the control device 4 operates the virtual robot 3 displayed on the transmission type display device 6 before operating the real robot 1. Thus, when the real robot 1 operates based on the input instruction information, the operator can easily understand a post-operation state of the real robot 1, and can easily understand whether a contact or the like of the real robot 1 with a device or the like disposed in the work space occurs or not.

Thus, the operator no longer need to operate (manipulate) the real robot 1 little by little so that a contact or the like with a device or the like disposed in the work space does not occur. Thus, a work load of the operator can be reduced, and work efficiency can be improved.

Note that in Embodiment 1, although a mode is employed in which the control device 4 displays the virtual robot 3 on the transmission type display device 6 in a manner overlapping the real robot 1 visually recognized by the operator, the embodiment is not limited thereto.

Embodiment 2

A robot system according to Embodiment 2 is such that, in the robot system according to Embodiment 1, the operating device is constituted of a measuring device that measures movement of a hand of an operator, and the control device is configured to display a virtual hand on the transmission type display device so as to correspond to movement of the hand of the operator measured by the measuring device.

Hereinafter, an example of the robot system according to Embodiment 2 will be described with reference to FIGS. 9 and 10.

[Configuration of Robot System]

Figure 9:
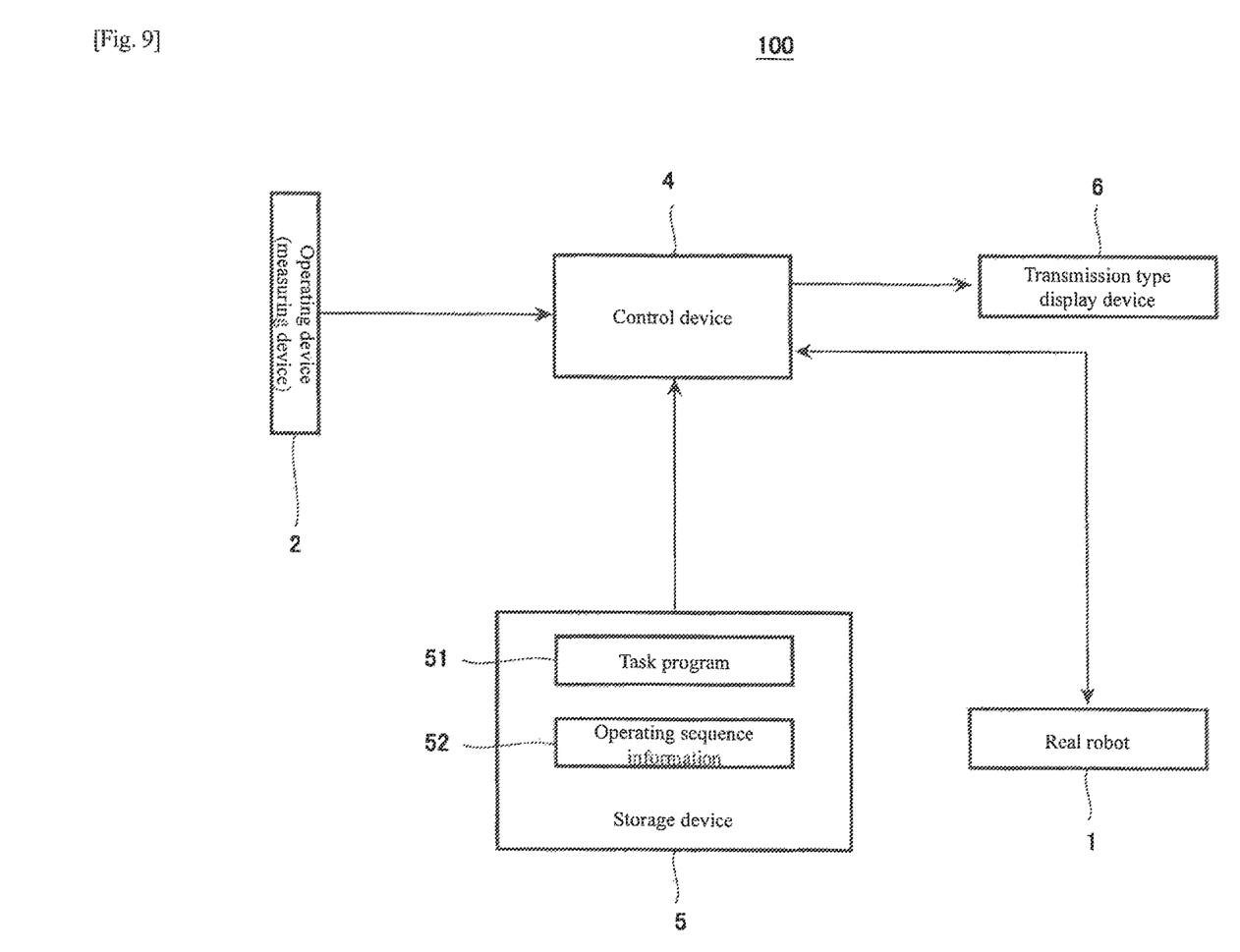
FIG. 9 is a block diagram illustrating a schematic configuration of a robot system according to Embodiment 2.

FIG. 9 is a block diagram illustrating a schematic configuration of the robot system according to Embodiment 2. FIG. 10 is a schematic view illustrating a field of view visually recognized by an operator via the transmission type display device in the robot system according to Embodiment 2.

As illustrated in FIG. 9, the robot system 100 according to Embodiment 2 has a same basic configuration as the robot system 100 according to Embodiment 1, but differs in that an operating device 2 is constituted of a measuring device that measures movement of the hand of the operator. The measuring device that measures movement of the hand of the operator may be a glove (data glove) provided with various sensors (for example, an acceleration sensor and a gyro sensor), or may be a device such as Leap Motion in which a sensor such as an infrared sensor is attached to the operator, and the sensor measures movement of the hand of the operator.

Figure 10:
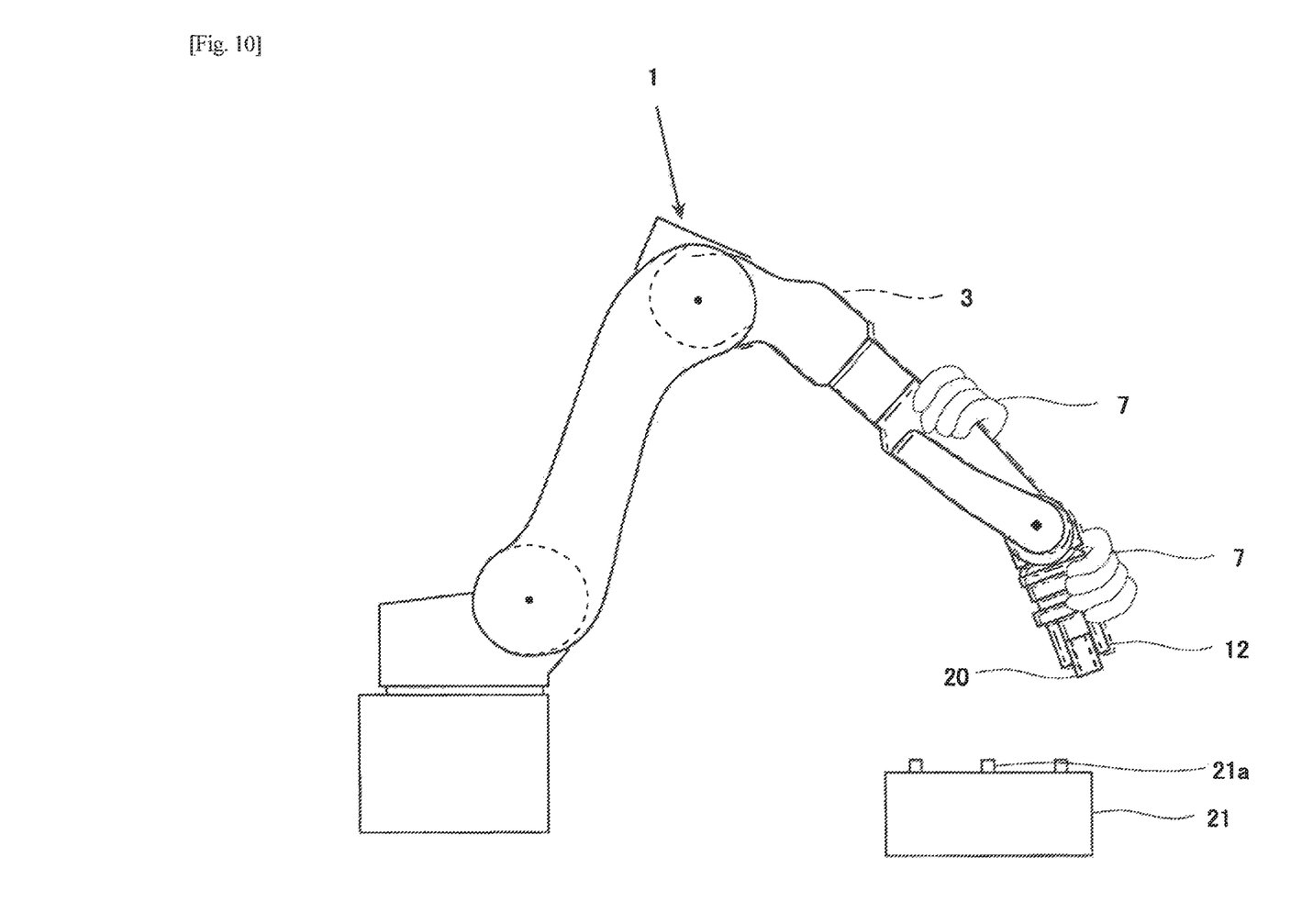
FIG. 10 is a schematic view illustrating a field of view visually recognized by an operator via a transmission type display device in the robot system according to Embodiment 2.

Further, as illustrated in FIG. 10, in the robot system 100 according to Embodiment 2, the control device 4 is configured to display a virtual hand 7 on the transmission type display device 6 so as to correspond to movement of the hand of the operator measured by the measuring device. Thus, the operator can hold and move (direct teach) the virtual robot 3 with the virtual hand 7.

The robot system 100 according to Embodiment 2 configured as described above also has similar effects to those of the robot system 100 according to Embodiment 1.

From the above description, many improvements and other embodiments of the present invention will be apparent to those skilled in the art. Therefore, the above description should be taken as exemplary only, and is provided for the purpose of teaching those skilled in the art the best mode for carrying out the present invention. The structural and/or functional details of the present invention may be substantially changed without departing from the spirit of the present invention.

INDUSTRIAL APPLICABILITY

A robot system and a method for operating the same of the present invention is capable of reducing a load on an operator and improving work efficiency, and thus are useful in the field of robots.

REFERENCE SIGNS LIST 1 real robot
2 operating device
3 virtual robot
4 control device
5 storage device
6 transmission type display device
6a display unit
6b camera
7 virtual hand
11a first link
11b second link
11c third link
11d fourth link
11e fifth link
11f sixth link
15 base
20 cylindrical workpiece
21 base
21a protrusion
51 task program
52 operating sequence information
100 robot system
JT1 first joint
JT2 second joint
JT3 third joint
JT4 fourth joint
JT5 fifth joint
JT6 sixth joint

The invention claimed is:

1. A robot system comprising:
an operating device that receives an operation instruction from an operator and comprises a sensor that measures movement of a hand of the operator;
a real robot that is installed in a work space and performs a series of works constituted of a plurality of steps;
a display configured to allow the operator to visually recognize a real world and configured to display a virtual robot; and
a controller implemented with hardware configured to:
cause the display to display the virtual robot so as to overlap the real robot, the virtual robot having a shape that corresponds to a shape of the real robot;
operate the virtual robot displayed on the display based on the operation instruction input from the operating device, such that the virtual robot moves away from the real robot on the display and either only partially overlaps the real robot or does not overlap the real robot at all; and
thereafter, operate the real robot when the operation instruction input from the operating device is an instruction to execute an operation of the real robot.

2. The robot system according to claim 1, wherein the operating device is constituted of at least one of a mobile terminal, a master arm, a teaching pendant, a joystick, or a voice input device.

3. The robot system according to claim 1, wherein the display is configured to be worn by the operator.

4. The robot system according to claim 1, wherein the controller is configured to:
operate a virtual robot arm of the virtual robot displayed on the display based on the operation instruction input from the operating device; and
thereafter, operate a robot arm of the real robot while maintaining a state that at least a virtual base of the virtual robot overlaps a base of the real robot on the display when the operation instruction to execute the operation of the real robot is input from the operating device.

5. The robot system according to claim 1, wherein the controller is further configured to display a virtual hand on the display so as to correspond to movement of the hand of the operator measured by the sensor.

6. A method for operating a robot system that includes: an operating device that receives an operation instruction from an operator and includes a sensor that measures movement of a hand of the operator; a real robot that is installed in a work space and performs a series of works constituted of a plurality of steps; and a display configured to allow the operator to visually recognize a real world and configured to display a virtual robot so as to overlap the real robot, the virtual robot having a shape that corresponds to a shape of the real robot, the method comprising:
displaying, by the display, an operation of the virtual robot based on the operation instruction input from the operating device, such that the virtual robot moves away from the real robot on the display and either only partially overlaps the real robot or does not overlap the real robot at all; and
thereafter, operating the real robot based on the operation instruction input from the operating device when the operation instruction input from the operating device is an instruction to execute an operation of the real robot.

7. The method for operating the robot system according to claim 6, wherein the operating device is constituted of at least one of a mobile terminal, a master arm, a teaching pendant, a joystick, or a voice input device.

8. The method for operating the robot system according to claim 6, wherein the display is configured to be worn by the operator.

9. The method for operating the robot system according to claim 6, further comprising:
displaying, by the display, an operation of a virtual robot arm of the virtual robot based on the operation information input from the operating device; and
thereafter, operating a robot arm of the real robot based on the operation instruction input from the operating device in a state that the display displays at least a virtual base of the virtual robot so as to overlap a base of the real robot when the operation instruction to execute the operation of the real robot is input from the operating device.

10. The method for operating the robot system according to claim 6, further comprising displaying, by the display, a virtual hand so as to correspond to movement of the hand of the operator measured by the sensor.

* * * * *